United States Patent
Lin et al.

(10) Patent No.: US 10,539,975 B1
(45) Date of Patent: Jan. 21, 2020

(54) COMPUTER

(71) Applicants: INVENTEC (PUDONG) TECHNOLOGY CORPORATION, Shanghai (CN); INVENTEC CORPORATION, Taipei (TW)

(72) Inventors: Chun-Chi Lin, Taipei (TW); Jui Hsiang Chen, Taipei (TW); Kuan-Wei Lee, Taipei (TW); I-Ko Song, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/353,968

(22) Filed: Mar. 14, 2019

(30) Foreign Application Priority Data

Nov. 23, 2018 (CN) .......................... 2018 1 1405558

(51) Int. Cl.
*G06F 1/16* (2006.01)
*H01R 25/00* (2006.01)

(52) U.S. Cl.
CPC .......... *G06F 1/1616* (2013.01); *G06F 1/1632* (2013.01); *H01R 25/003* (2013.01)

(58) Field of Classification Search
CPC .... G06F 1/1601; G06F 1/1607; G06F 1/1613; G06F 1/1616; G06F 1/1632; G06F 1/1679
USPC ............ 361/679.02, 679.06, 679.09, 679.15, 361/679.3, 679.55
See application file for complete search history.

(56) References Cited

U.S. PATENT DOCUMENTS

| | | | |
|---|---|---|---|
| 5,247,285 A * | 9/1993 | Yokota | E05C 1/10 248/919 |
| 6,256,192 B1 * | 7/2001 | Shannon | G06F 1/1616 312/223.2 |
| 6,353,529 B1 * | 3/2002 | Cies | G06F 1/1616 248/917 |
| 8,223,489 B2 * | 7/2012 | Shih | E05C 19/16 361/679.55 |
| 8,310,823 B2 * | 11/2012 | Stoltz | G06F 1/1616 361/679.08 |
| 8,553,403 B2 * | 10/2013 | Chang | G06F 1/1654 361/679.2 |
| 8,724,301 B2 * | 5/2014 | Mahmoud | G06F 3/02 345/901 |
| 9,436,229 B2 * | 9/2016 | Yoo | G06F 1/1637 |
| 10,146,267 B2 * | 12/2018 | Perelli | G06F 1/1679 |
| 2005/0052831 A1 * | 3/2005 | Chen | G06F 1/1616 361/679.11 |

(Continued)

*Primary Examiner* — Anthony Q Edwards
(74) *Attorney, Agent, or Firm* — Maschoff Brennan (57) ABSTRACT

This disclosure relates to a computer including a computer host, a screen and a keyboard. The computer host includes a first side, a second side, a third side and a fourth side. The first side and the third side are located opposite to each other. The second side and the fourth side are located between the first side and the third side and are located opposite to each other. The screen includes a first connecting side and a second connecting side opposite to each other. The first connecting side of the screen is pivotably connected to the first side of the computer host. The keyboard is pivotably connected to the second connecting side of the screen.

9 Claims, 10 Drawing Sheets

(56) References Cited

U.S. PATENT DOCUMENTS

| | | | |
|---|---|---|---|
| 2005/0164752 A1* | 7/2005 | Lau | G06F 1/1616 455/575.3 |
| 2006/0126284 A1* | 6/2006 | Moscovitch | B60R 11/02 361/679.04 |
| 2009/0091885 A1* | 4/2009 | Burford | B41J 3/36 361/679.55 |
| 2009/0190295 A1* | 7/2009 | Chin | G06F 1/1618 361/679.27 |
| 2010/0014229 A1* | 1/2010 | Horie | G06F 1/16 361/679.01 |

* cited by examiner

COMPUTER

CROSS-REFERENCE TO RELATED APPLICATIONS

This non-provisional application claims priority under 35 U.S.C. § 119(a) on Patent Application No(s). 201811405558.2 filed in China, P.R.C. on Nov. 23, 2018, the entire contents of which are hereby incorporated by reference.

BACKGROUND OF THE INVENTION

Technical Field of the Invention

The present disclosure relates to a computer, more particularly to a computer including a keyboard and a computer host that are respectively connected to opposite sides of a screen.

Description of the Related Art

An all-in-one PC or miniature PC has become popular in the market since it is smaller-sized and portable than a tower PC.

To enhance the user's experience, the all-in-one or miniature PC requires peripheral devices to obtain more functionality.

SUMMARY OF THE INVENTION

According to one aspect of the present disclosure, a computer includes a computer host, a screen, and a keyboard. The computer host includes a first side, a second side, a third side and a fourth side. The first side and the third side are located opposite to each other. The second side and the fourth side are located between the first side and the third side and are located opposite to each other. The screen includes a first connecting side and a second connecting side opposite to each other. The first connecting side of the screen is pivotably connected to the first side of the computer host. The keyboard is pivotably connected to the second connecting side of the screen.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
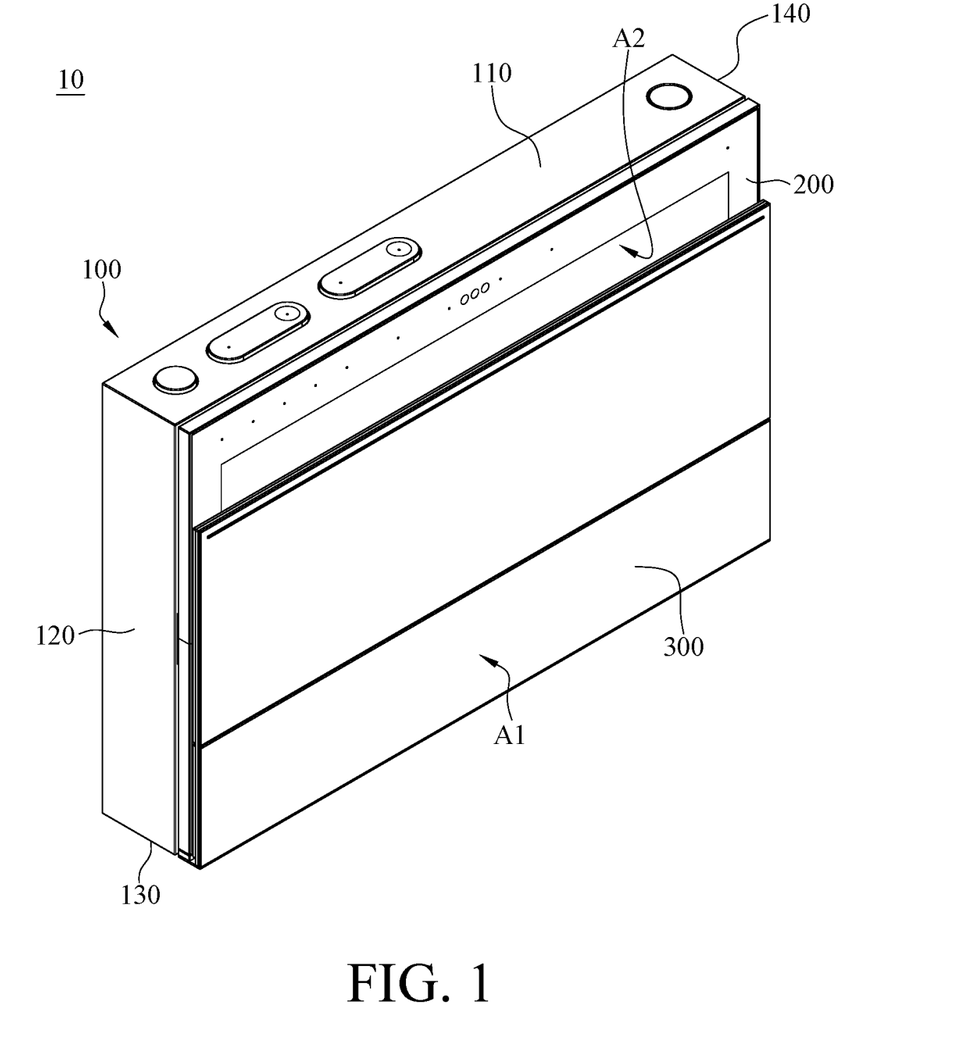
FIG. 1 is a perspective view of a computer according to one embodiment of the present disclosure.
Figure 2:
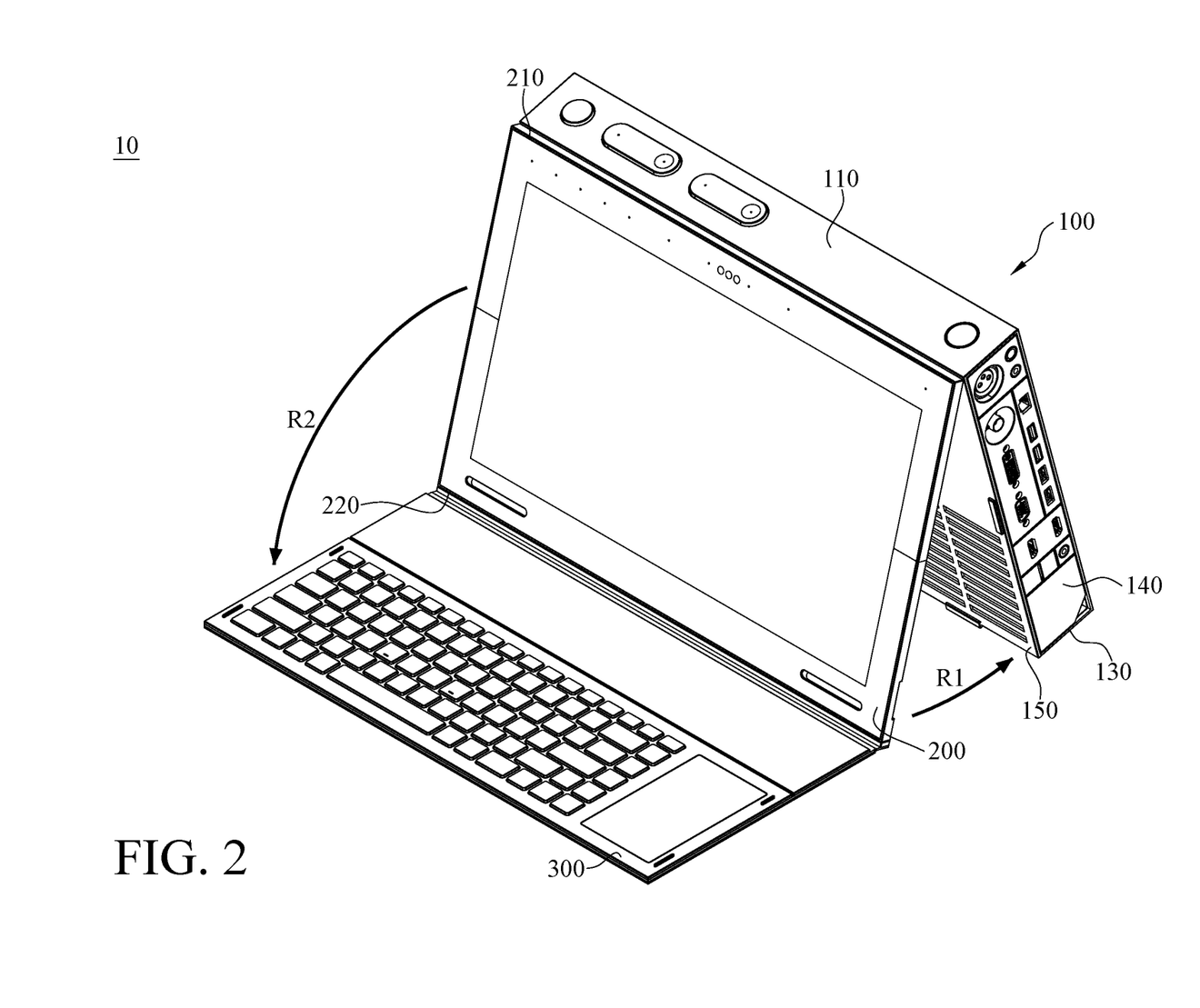
FIG. 2 is a perspective view of the computer in FIG. 1 when a computer host and a keyboard are pivoted with respect to a screen.

Please refer to FIG. 1 to FIG. 2, which FIG. 1 is a perspective view of a computer 10 according to one embodiment of the present disclosure, and FIG. 2 is a perspective view of the computer 10 in FIG. 1 when a computer host 100 and a keyboard 300 are pivoted with respect to a screen 200.

In this embodiment, the computer 10 includes the computer host 100, the screen 200, and the keyboard 300. The computer host 100 includes a first side 110, a second side 120, a third side 130, and a fourth side 140. The first side 110 and the third side 130 are located opposite to each other. The second side 120 and the fourth side 140 are located between the first side 110 and the third side 130 and are located opposite to each other. The computer 10 may be placed on a platform (e.g., a table) in a way that the third side 130 of the computer host 100 faces the platform. The screen 200 includes a first connecting side 210 and a second connecting side 220 opposite to each other. The first connecting side 210 of the screen 200 is pivotably connected to the first side 110 of the computer host 100. The keyboard 300 is pivotably connected to the second connecting side 220 of the screen 200, for example, in a detachable manner.

Since the computer host 100 and the keyboard 300 are respectively pivotably disposed at the first connecting side 210 and the second connecting side 220 of the screen 200, the computer host 100, the screen 200 and the keyboard 300 can be stored together, and the screen 200 and the keyboard 300 can be pivoted with respect to the computer host 100. Specifically, as shown in FIG. 2, the computer host 100 can be pivoted along a first direction R1 to adjust the inclination of the screen 200, and the keyboard 300 can be pivoted along a second direction R2 to expose the screen 200.

In addition, in FIG. 2, in this and some embodiments of the present disclosure, the computer host 100 may further include a detachable plate 150 detachably disposed at a side of the computer host 100 close to the screen 200. During maintenance, the detachable plate 150 can be removed from the computer host 100 to gain access to the internal electrical components of the computer host 100. In addition, the detachable plate 150 may have some screw holes or vents (not shown in the drawings), but these screw holes or vents can be hidden behind the screen 200, such that the outer appearance of the computer host 100 is simple and aesthetically pleasing.

Further, as shown in FIG. 1, in this and some embodiments of the present disclosure, a first area A1 of the keyboard 300 is smaller than a second area A2 of the screen 200, wherein the first area A1 is the area of a side of the keyboard 300 facing away from the keys, and the second area A2 is the area of a side of the screen 200 having the display surface. Accordingly, when the keyboard 300 is stacked on the screen 200, part of the screen 200 is still not covered by the keyboard 300. And there may be an indicator light (not shown in the drawings) disposed in the uncovered part of the screen 200 for indicating the mode of the computer 10, such as recording mode or busy mode.

Consequently, the computer 10 may be placed on the platform which the third side 130 of the computer host 100 faces, and the computer 10 may be used in a manner that the computer host 100 and the keyboard 300 are pivoted with respect to the screen 200 or in a manner that the computer host 100 and the keyboard 300 are stacked on the screen 200.

Figure 3:
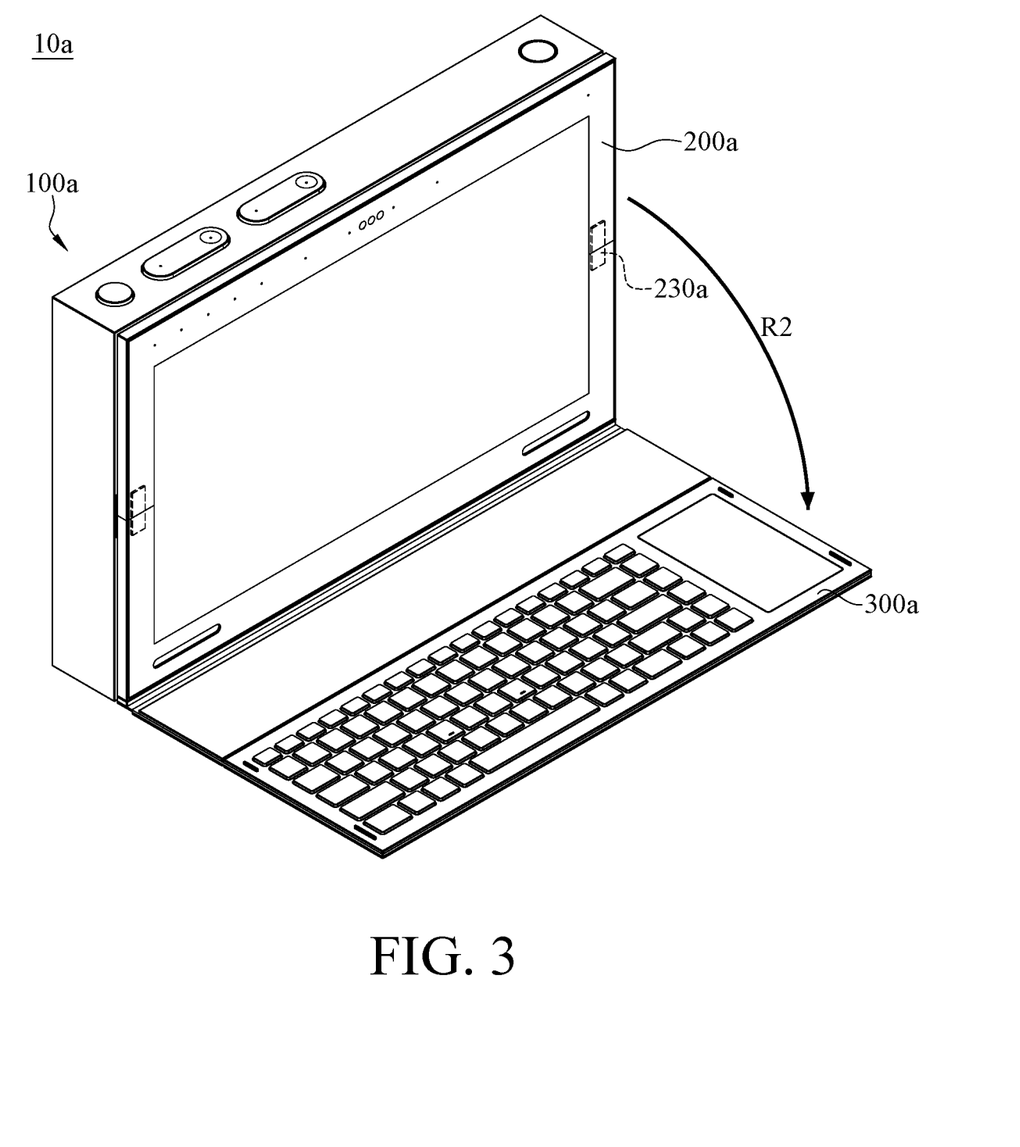
FIG. 3 is a perspective view of a computer according to another embodiment of the present disclosure when a keyboard is pivoted with respect to a screen.

Please refer to FIG. 3, which is a perspective view of a computer 10a according to another embodiment of the present disclosure when a keyboard 300a is pivoted with respect to a screen 200a. It is noted that only the differences from the preceding embodiments are described hereinafter. In this and some embodiments of the present disclosure, the keyboard 300a is made of metal. The screen 200a may further include two magnetic components 230a, but the disclosure is not limited thereto. In some embodiments, the screen may include one magnetic component or more than two magnetic components. In this and some embodiments of the present disclosure, the magnetic components 230a are configured to attract the keyboard 300a so that the keyboard 300a can be fixed to the screen 200a via the magnetic components 230a. The magnetic components 230a are hidden in the screen 200a and would not affect the appearance of the screen 200a. The keyboard 300a is also able to be pivoted along a second direction R2 to expose the screen 200a. However, the magnetic components 230a are optional; in some embodiments, the keyboard may not have any magnetic component, and the keyboard may have a hook or a latch to be fixed to the screen.

Consequently, the computer 10a may be placed on the platform which a third side 130a of a computer host 100a faces, and the computer 10a may be used in a manner that the keyboard 300a is pivoted with respect to the screen 200a or in a manner, as shown in FIG. 1 or FIG. 2, that the computer host 100a and the keyboard 300a are pivoted with respect to the screen 200a or are stacked on the screen 200a. Similarly, the computer 10 may be used in a manner, as shown in FIG. 3, that the keyboard 300 is pivoted with respect to the screen 200.

Figure 4:
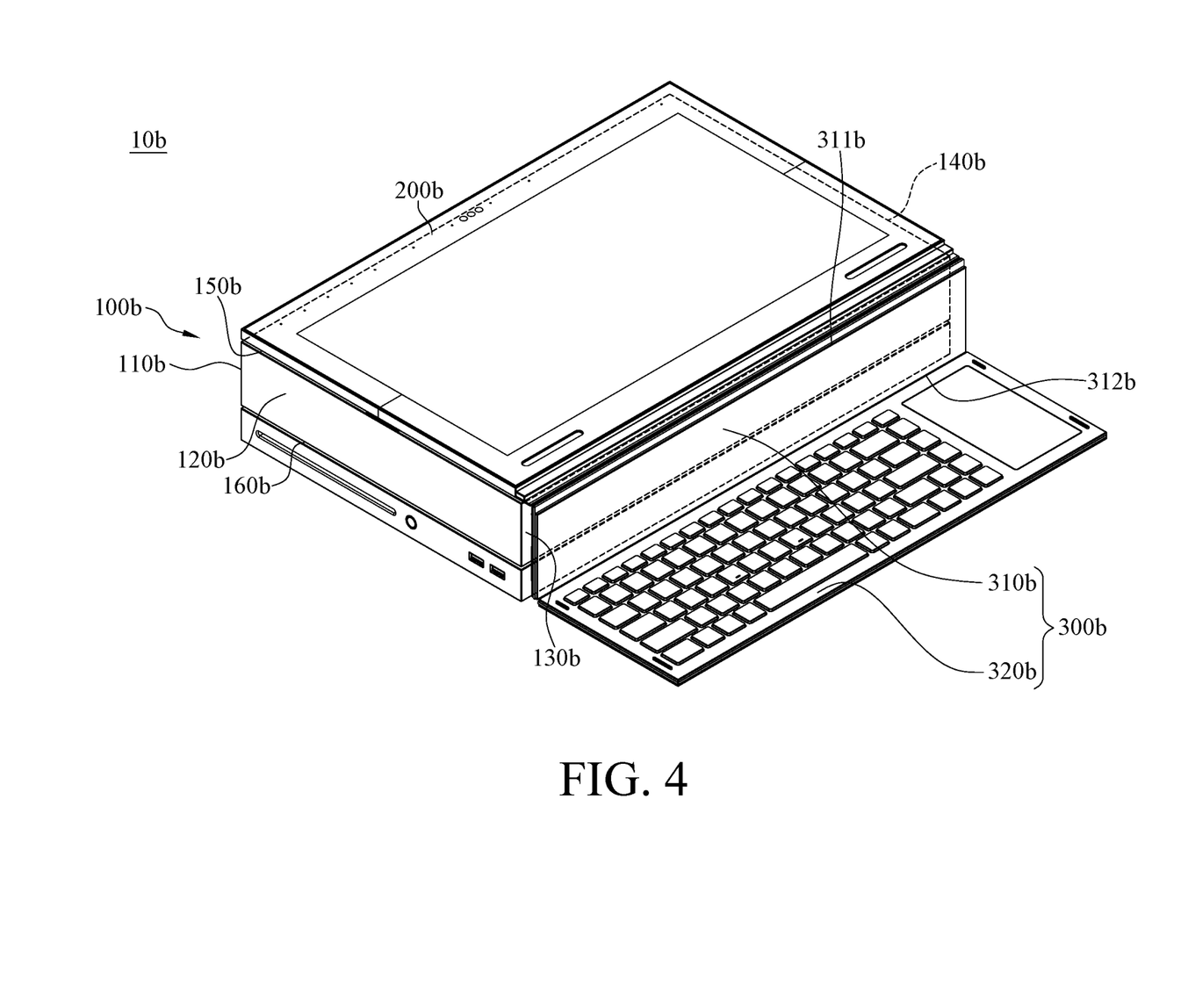
FIG. 4 is a perspective view of a computer according to yet another embodiment of the present disclosure when a keyboard is opened and folded.

Please refer to FIG. 4, which is a perspective view of a computer 10b according to yet another embodiment of the present disclosure when a keyboard 300b is opened and folded. It is noted that only the differences from the preceding embodiments are described hereinafter. In this and some embodiments of the present disclosure, a computer host 100b may further include a connecting plate 160b located at a side of the computer host 100b facing away from a screen 200b. The connecting plate 160b and a detachable plate 150b are located at two opposite sides of the computer host 100b. The connecting plate 160b is connected to a first side 110b, a second side 120b, a third side 130b and a fourth side 140b of the computer host 100b. The computer host 100b may further include, for example, a microphone (not shown in the drawings) or a camera (not shown in the drawings) at the first side 110b. The computer 10b may be placed on the platform in a way that the connecting plate 160b faces the platform and the microphone or the camera at the first side 110b faces a target sound source or a target object, which facilitates the recording or filming.

Furthermore, the keyboard 300b may further include a first plate part 310b and a second plate part 320b. The first plate part 310b may further has a first pivoting side 311b and a second pivoting side 312b opposite to each other. The first pivoting side 311b of the first plate part 310b is pivotably connected to the screen 200b, and the second pivoting side 312b of the first plate part 310b is pivotably connected to the second plate part 320b. The keyboard 300b can be opened and folded, as shown in the figure, the keyboard 300b may be placed in a way that the first plate part 310b can be laid on the third side 130b of the computer host 100b, and the second plate part 320b can be laid on the platform. Similarly, the computer 10b may be placed and used as shown in FIG. 1, FIG. 2, or FIG. 3, and it will not be repeated again.

Figure 5:
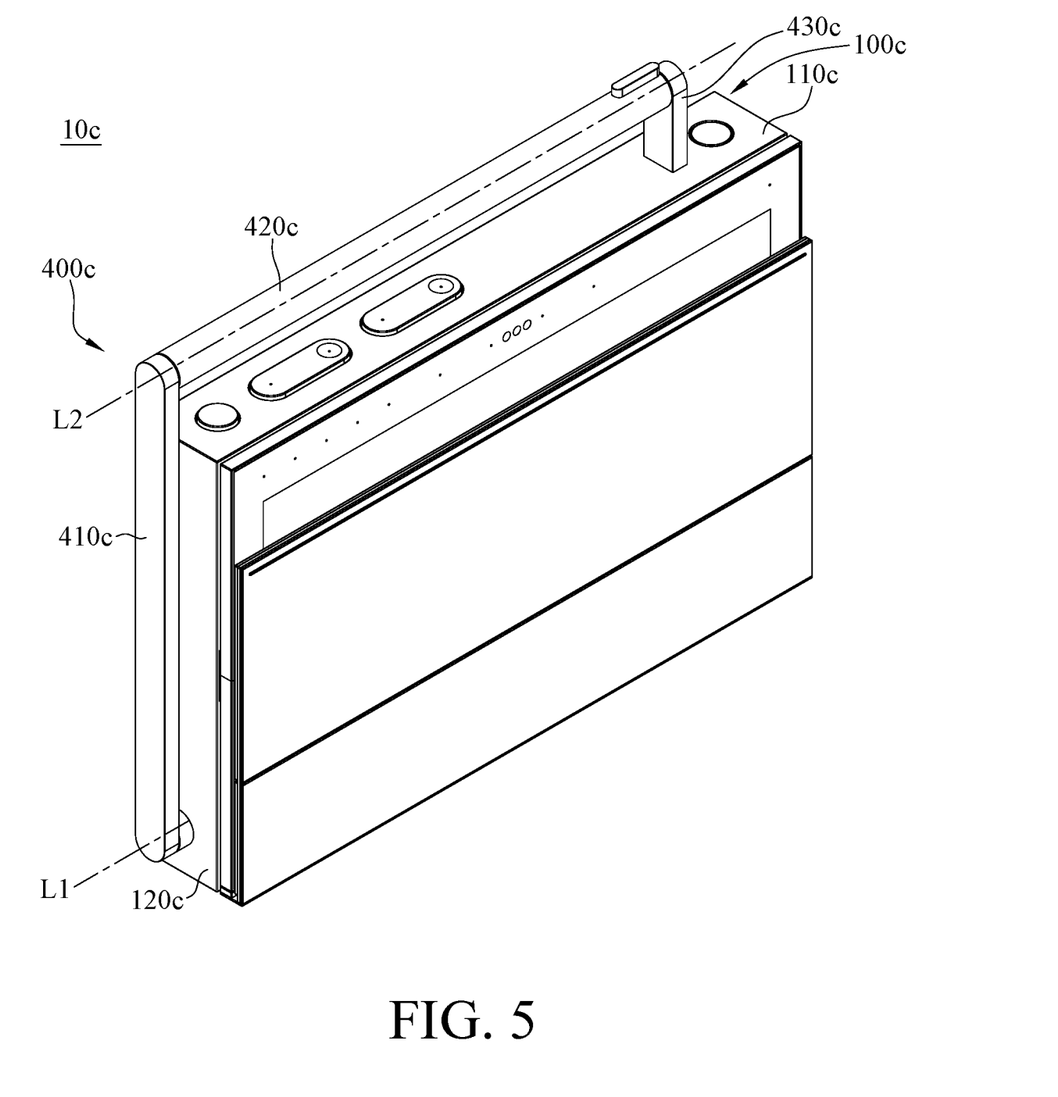
FIG. 5 is a perspective view of a computer according to yet still another embodiment of the present disclosure.
Figure 6:
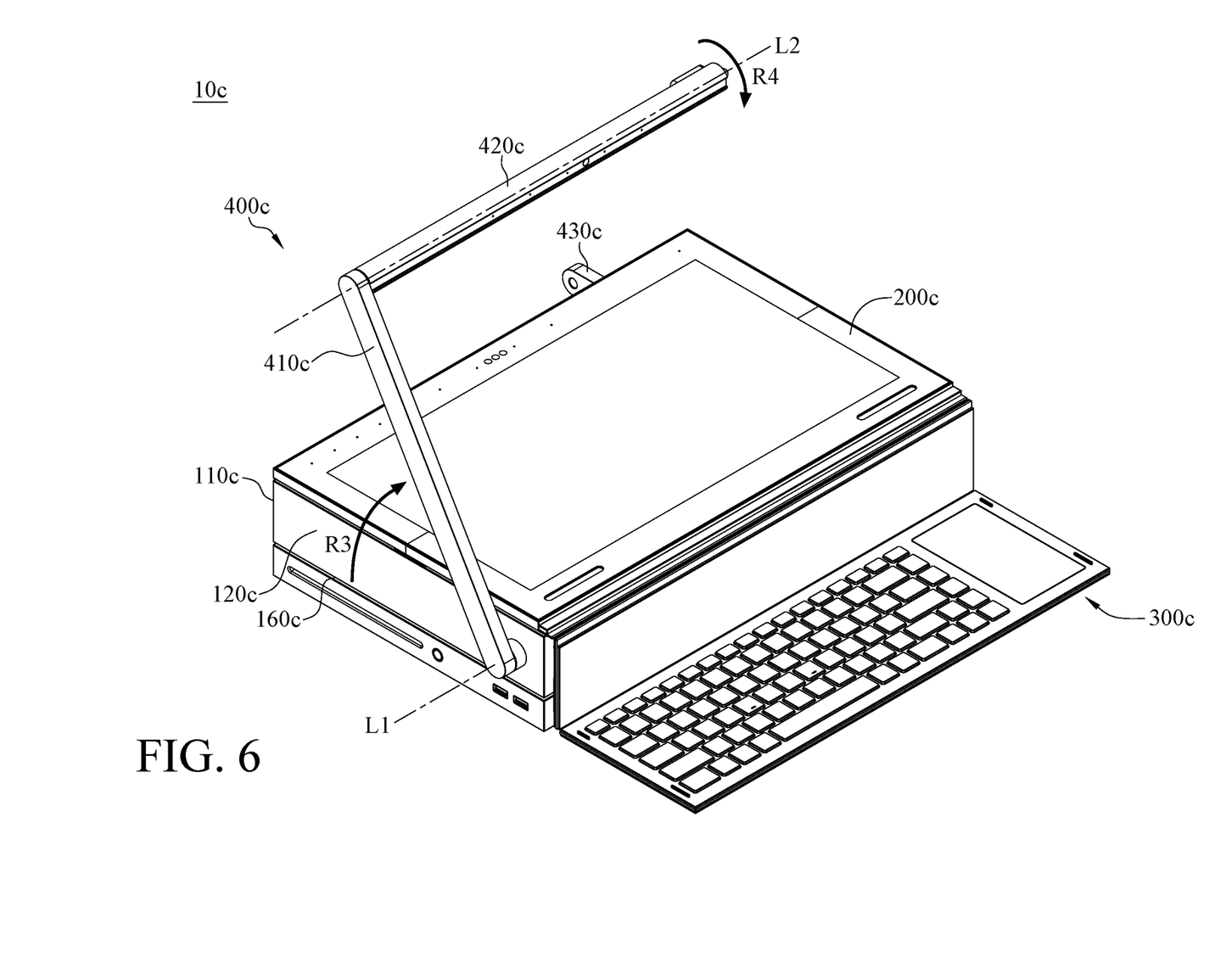
FIG. 6 is a perspective view of the computer in FIG. 5 when a keyboard and a handle are pivoted with respect to a screen.

Please refer to FIG. 5 to FIG. 6, which FIG. 5 is a perspective view of a computer 10c according to yet still another embodiment of the present disclosure, and FIG. 6 is a perspective view of the computer 10c in FIG. 5 when a keyboard 300c and a handle 400c are pivoted with respect to a screen 200c. It is noted that only the differences from the preceding embodiments are described hereinafter. In this and some embodiments of the present disclosure, the computer 10c may further include the handle 400c sized to be hand-held, and the computer 10c can be carried by holding the handle 400c. The handle 400c may further include a first part 410c, a second part 420c and a third part 430c. The first part 410c is pivotably disposed on a second side 120c of a computer host 100c about a first axis L1 which is toward the second side 120c of the computer host 100c. The second part 420c is connected to the first part 410c and is detachably connected to the third part 430c. The third part 430c is disposed on a first side 110c of the computer host 100c. As shown in FIG. 6, when the computer 10c is placed on the platform in a way that a connecting plate 160c faces the platform, the second part 420c of the handle 400c can be detached from the third part 430c to allow the first part 410c to be pivoted along a third direction R3 about the first axis L1. A microphone (not shown in the drawings) or a camera (not shown in the drawings), for example, may be disposed on the second part 420c of the handle 400c. The microphone or the camera can be adjusted to face a target sound source or a target object by pivoting the first part 410c of the handle 400c, which facilitates the recording or filming.

Furthermore, the second part 420c of the handle 400c is pivotably connected to the first part 410c about a second axis L2 which is substantially in the same direction with the first axis L1. The angle of the microphone or the camera on the second part 420c can also be adjusted by pivoting the second part 420c along a fourth direction R4 about the second axis L2.

Figure 7:
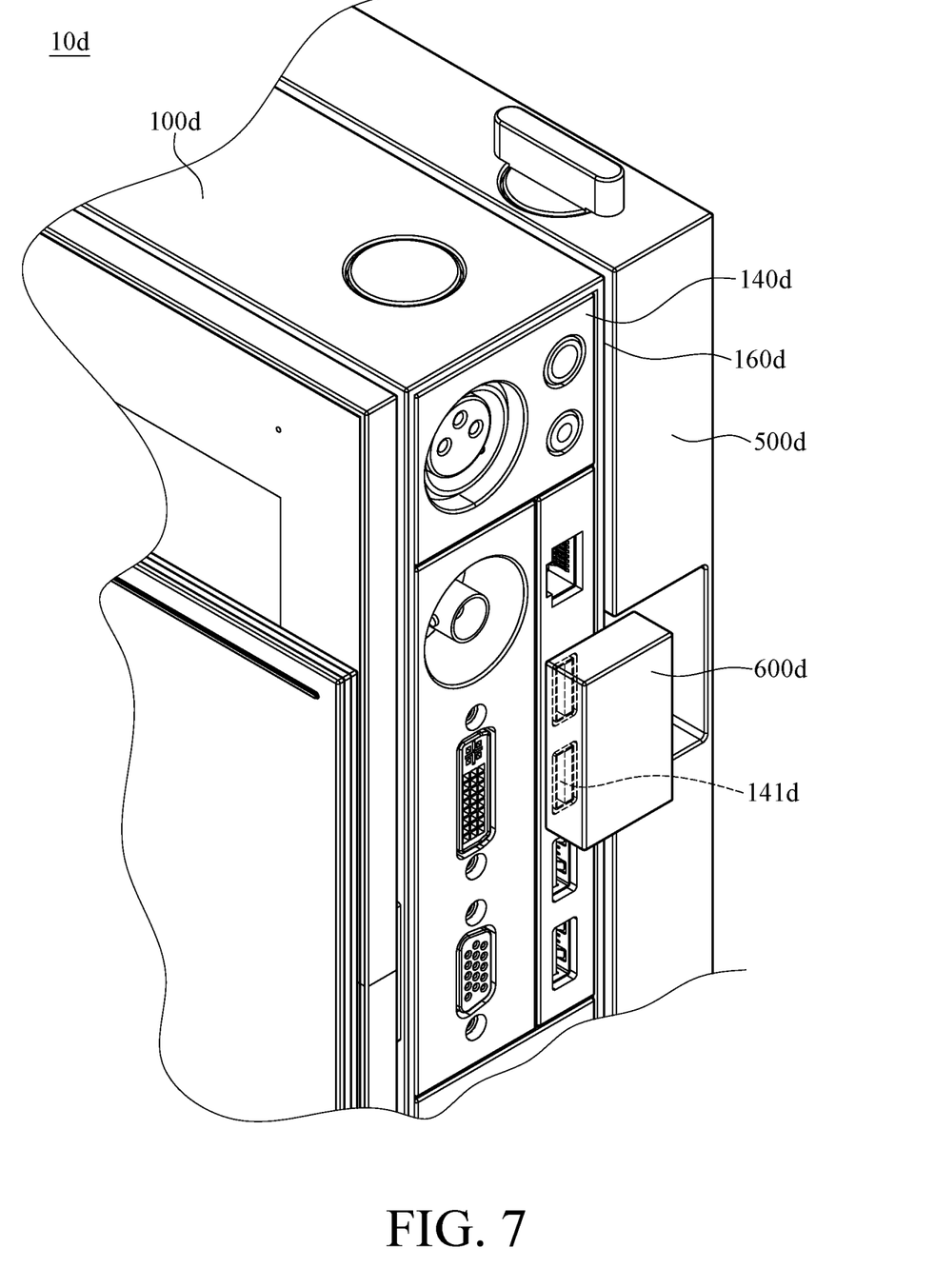
FIG. 7 is a partially perspective view of a computer according to yet still further another embodiment of the present disclosure when a plug is inserted into a socket of a computer host.
Figure 8:
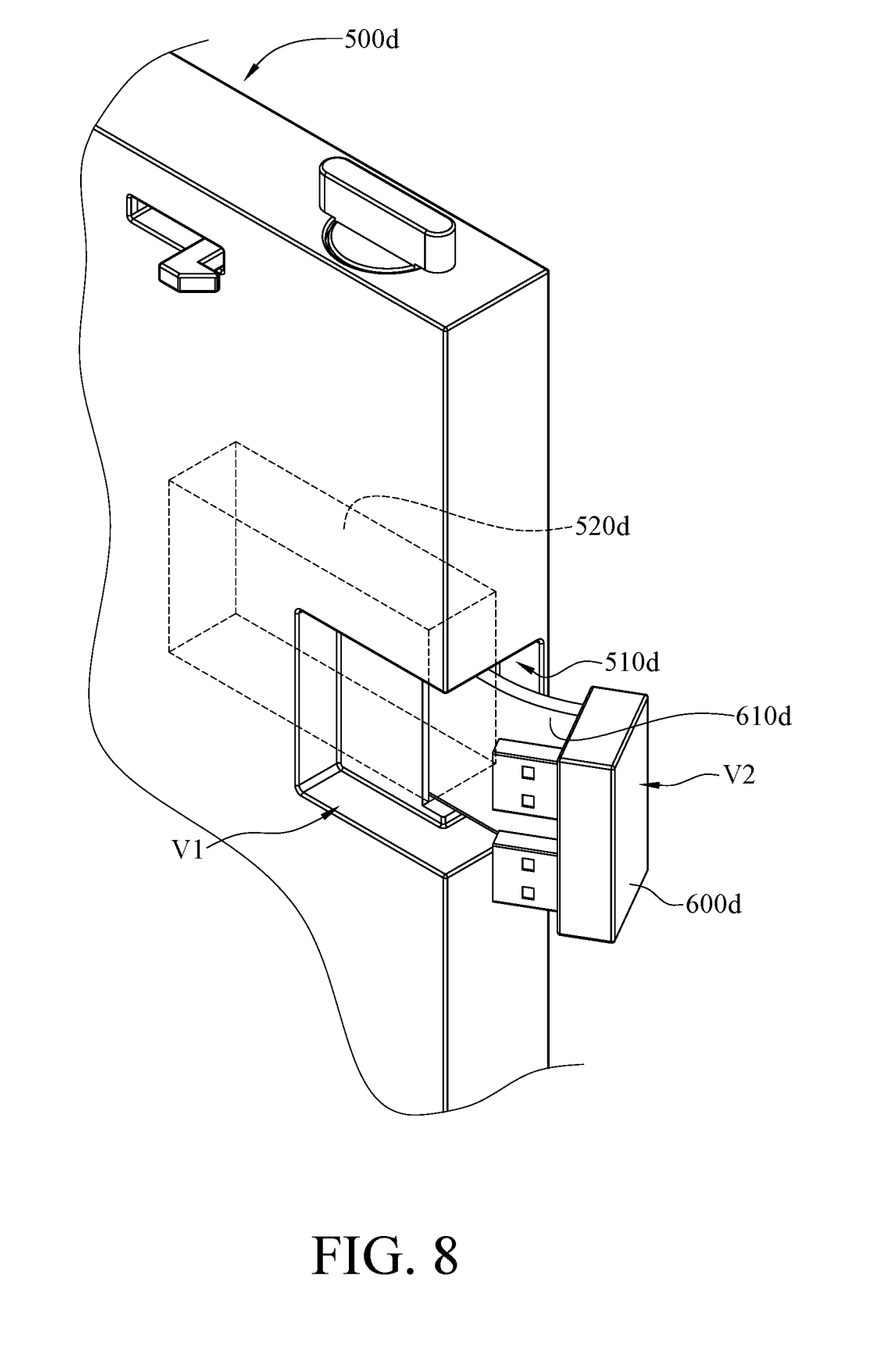
FIG. 8 is a partially perspective view of an expansion module of the computer in FIG. 7 when the plug is pulled out of the expansion module.

Please refer to FIG. 7 to FIG. 8, which FIG. 7 is a partially perspective view of a computer 10d according to yet still further another embodiment of the present disclosure when a plug is 600d inserted into a socket 141d of a computer host 100d, and FIG. 8 is a partially perspective view of an expansion module 500d of the computer 10d in FIG. 7 when the plug 600d is pulled out of the expansion module 500d. It is noted that only the differences from the preceding embodiments are described hereinafter. In this and some embodiments of the present disclosure, the computer 10d may further include the expansion module 500d and the plug 600d. The expansion module 500d, for example, is a CD player, a hard disk drive or a universal serial bus (USB) hub. The expansion module 500d is detachably disposed on a connecting plate 160d of a computer host 100d, for example, by a hook (not numbered in the drawings) so that the expansion module 500d can be carried along with the computer host 100d. The expansion module 500d may be flush with the computer host 100d to achieve a visual aesthetic effect. The computer host 100d may further include the socket 141d located on a fourth side 140d of the computer host 100d. The plug 600d, such as a USB male connector, may be disposed on the expansion module 500d and is electrically connected to the expansion module 500d. The plug 600d is detachably inserted into the socket 141d, such that data are allowed to be transmitted between the computer host 100d and the expansion module 500d via the plug 600d.

In detail, as shown in FIG. 8, the expansion module 500d may further have a recess 510d and a hole 520d. A first volume V1 of the recess 510d is larger than a second volume V2 of the plug 600d. The hole 520d is connected to the recess 510d. The plug 600d may further include a power cable 610d slidably disposed at the hole 520d and electrically connected to the expansion module 500d. The power cable 610d is flexible, and the plug 600d is movably disposed on the expansion module 500d via the power cable 610d. The power cable 610d and the plug 600d can be respectively stored in the hole 520d and the recess 510d of the expansion module 500d.

Figure 9:
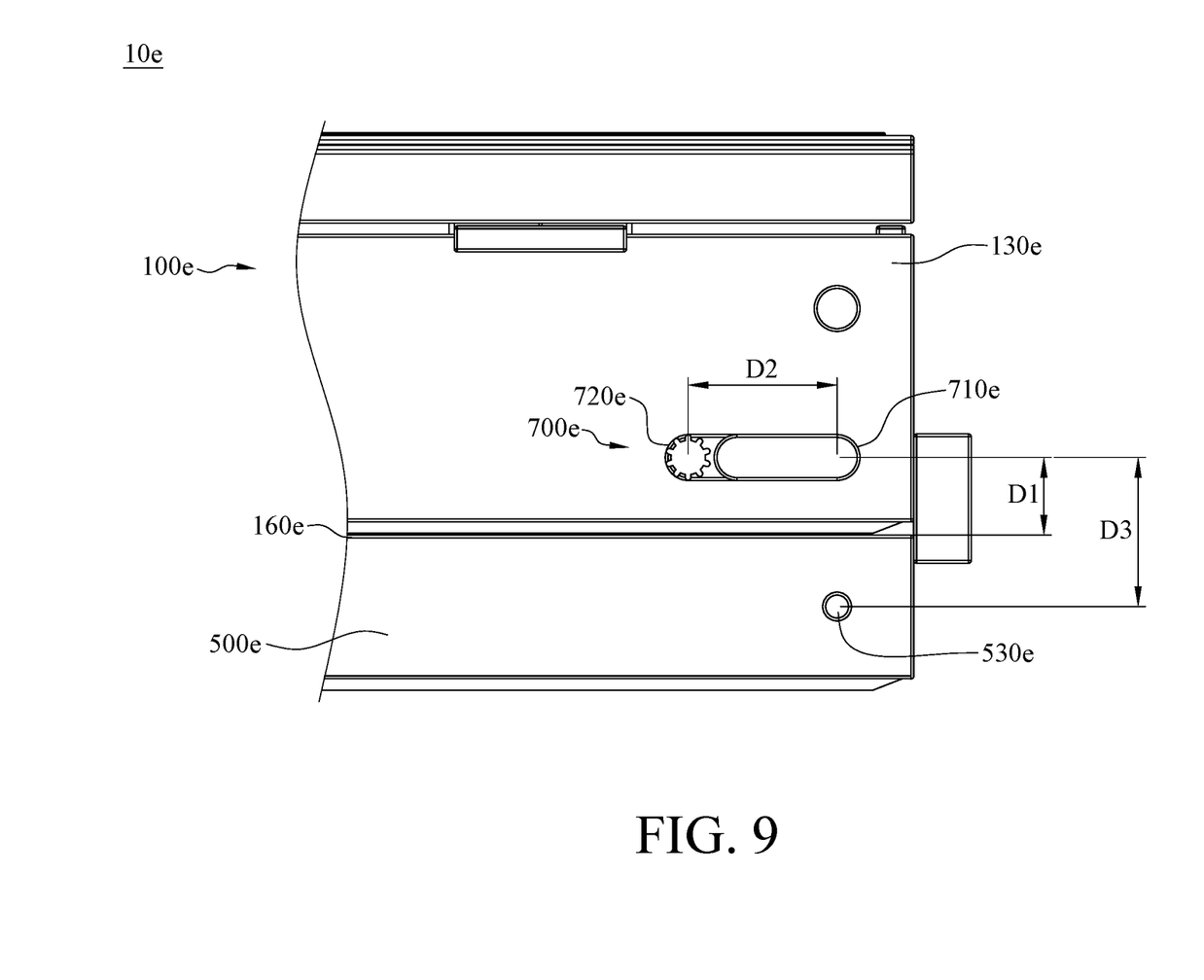
FIG. 9 is a partially bottom view of the computer in FIG. 7 when the expansion module is disposed on a connecting plate.
Figure 10:
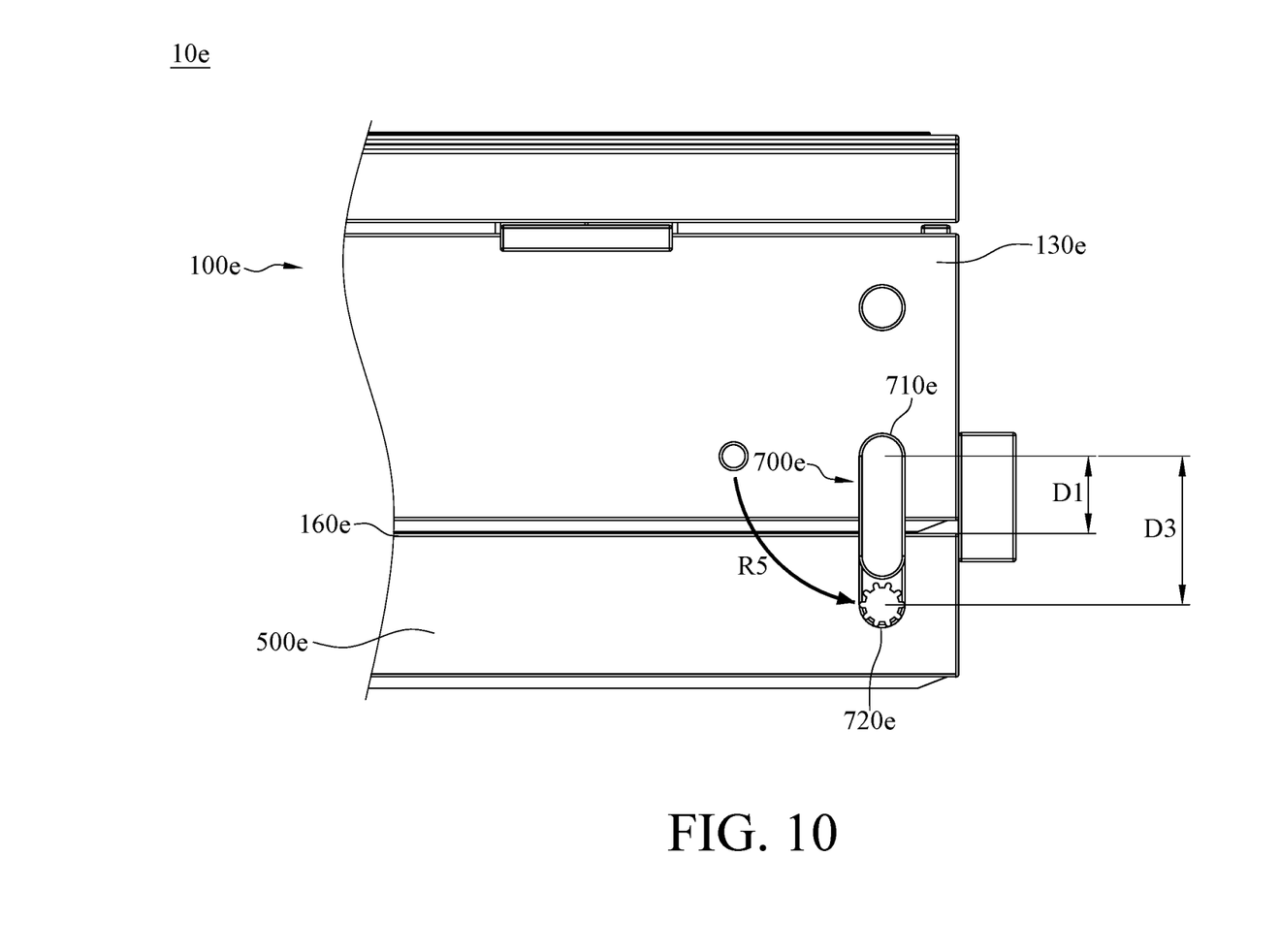
FIG. 10 is a partially bottom view of the computer in FIG. 9 when at least one buffer component is disposed on the expansion module.

Please refer to FIG. 9 to FIG. 10, which FIG. 9 is a partially bottom view of a computer 10e in FIG. 7 when an expansion module 500e is disposed on a connecting plate 160e, and FIG. 10 is a partially bottom view of the computer 10e in FIG. 9 when at least one buffer component 700e is disposed on the expansion module 500e. It is noted that only the differences from the preceding embodiments are described hereinafter. In this and some embodiments of the present disclosure, the computer 10e may further include the at least one buffer component 700e. The buffer component 700e protrudes from a third side 130e of a computer host 100e and may have a specific thickness. The buffer component 700e may further include a fixed end 710e and a free end 720e opposite to each other. The fixed end 710e of the buffer component 700e is pivotably fixed on the third side 130e of the computer host 100e. A first distance D1 between the fixed end 710e and a connecting plate 160e is smaller than a second distance D2 between the fixed end 710e and the free end 720e of the buffer component 700e. As shown in FIG. 10, while the expansion module 500e disposed on the connecting plate 160e of the computer host 100e, the free end 720e of the buffer component 700e can be pivoted along a fifth direction R5. As such, the computer host 100e and the expansion module 500e may be balanced on the buffer component 700e as the computer 10e is placed on the platform in a way that the third side 130e of the computer host 100e faces the platform.

In this and some embodiments of the present disclosure, the expansion module 500e may further have a screw hole 530e on the third side 130e of the computer host 100e. A third distance D3 between the fixed end 710e of the buffer component 700e and the screw hole 530e is substantially equal to the second distance D2 between the fixed end 710e and the free end 720e of the buffer component 700e. The free end 720e may be aligned with the screw hole 530e of the expansion module 500e by pivoting the buffer component 700e, and the buffer component 700e is able to be screwed into the screw hole 530e.

According to the computer discussed above, since the computer host and the keyboard are respectively pivotably disposed at the first connecting side and the second connecting side of the screen, the computer host, the screen and the keyboard can be stored together. The computer host can be pivoted along the first direction to adjust the inclination of the screen, and the keyboard can be pivoted along the second direction to expose the screen.

In some embodiments, the computer host may further include a detachable plate detachably disposed at a side of the computer host close to the screen. During maintenance, the detachable plate can be removed from the computer host to gain access to the internal electrical components of the computer host. In addition, the detachable plate may have some screw holes or vents, but these screw holes or vents can be hidden behind the screen, such that the outer appearance of the computer host is simple and aesthetically pleasing.

In some embodiments, the first area of the keyboard is smaller than the second area of the screen. Accordingly, when the keyboard is stacked on the screen, part of the screen is still not covered by the keyboard.

In some embodiments, the keyboard is made of metal. The screen may further include two magnetic components. The magnetic components are configured to attract the keyboard so that the keyboard can be fixed to the screen via the magnetic components. The magnetic components are hidden in the screen and would not affect the appearance of the screen. The keyboard is also able to be pivoted along the second direction to expose the screen.

In some embodiments, the computer host may further include a connecting plate located at a side of the computer host facing away from the screen. The computer may be placed on the platform in a way that the connecting plate faces the platform and the microphone or the camera at the first side faces a target sound source or a target object, which facilitates the recording or filming. The keyboard may further include a first plate part and a second plate part. The keyboard can be opened and folded, the keyboard may be placed in a way that the first plate part can be laid on the third side of the computer host, and the second plate part can be laid on the platform.

In some embodiments, the computer may further include a handle sized to be hand-held, and the computer can be carried by holding the handle. When the computer is placed on the platform in a way that the connecting plate faces the platform, the second part of the handle can be detached from the third part to allow the first part to be pivoted along the third direction about the first axis. The microphone or the camera can be adjusted to face a target sound source or a target object by pivoting the first part of the handle, which facilitates the recording or filming.

In some embodiments, the second part of the handle is pivotably connected to the first part about the second axis. The angle of the microphone or the camera on the second part can also be adjusted by pivoting the second part along the fourth direction about the second axis.

In some embodiments, the computer may further include an expansion module and a plug. The expansion module is detachably disposed on the connecting plate of the computer host so that the expansion module can be carried along with the computer host. The expansion module may be flush with the computer host to achieve a visual aesthetic effect. The plug is detachably inserted into the socket, such that data are allowed to be transmitted between the computer host and the expansion module via the plug.

In some embodiments, the expansion module may further have a recess and a hole. The first volume of the recess is larger than the second volume of the plug. The plug may further include a power cable. The power cable and the plug can be respectively stored in the hold and the recess of the expansion module.

In some embodiments, the computer may further include at least one buffer component. The buffer component protrudes from the third side of the computer host and may have a specific thickness. While the expansion module disposed on the connecting plate of the computer host, the free end of the buffer component can be pivoted along the fifth direction. As such, the computer host and the expansion module may be balanced on the buffer component as the computer is placed on the platform in a way that the third side of the computer host faces the platform.

In some embodiments, the expansion module may further have a screw hole. The free end may be aligned with the screw hole of the expansion module by pivoting the buffer component, and the buffer component is able to be screwed into the screw hole.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A computer, comprising:
    a computer host, comprising a first side, a second side, a third side and a fourth side, wherein the first side and the third side are located opposite to each other, and the second side and the fourth side are located between the first side and the third side and are located opposite to each other;
    a screen, comprising a first connecting side and a second connecting side opposite to each other, wherein the first connecting side of the screen is pivotably connected to the first side of the computer host;
    a keyboard, pivotably connected to the second connecting side of the screen; and
    a handle, comprising a first, a second part and a third part, wherein the first part is pivotably disposed on the second side of the computer host, the second part is connected to the first part and is detachably connected to the third part, and the third part is disposed on the first side of the computer host.

2. The computer according to claim 1, wherein the first part is pivotably disposed on the second side of the computer host about a first axis which is toward the second side of the computer host, and the second part of the handle is pivotably connected to the first part about a second axis which is substantially in a same direction with the first axis.

3. The computer according to claim 1, further comprising an expansion module and a plug, wherein the computer host further comprises a connecting plate located at a side of the computer host facing away from the screen and connected to the first side, the second side, the third side and the fourth side of the computer host, the expansion module is disposed on the connecting plate, the computer host further comprises a socket located on the fourth side, the plug is disposed on the expansion module and is electrically connected to the expansion module, and the plug is detachably inserted into the socket.

4. The computer according to claim 3, wherein the expansion module further has a recess and a hole connected to the recess, the recess is larger than the plug, the plug further comprises a power cable slidably disposed at the hole and electrically connected to the expansion module, the power cable is flexible, and the plug is movably disposed on the expansion module via the power cable.

5. The computer according to claim 3, further comprising a buffer component, wherein the buffer component further comprises a fixed end and a free end opposite to each other, the fixed end of the buffer component is pivotably fixed on the third side of the computer host, and a first distance between the fixed end and the connecting plate is smaller than a second distance between the fixed end and the free end of the buffer component.

6. The computer according to claim 5, wherein the expansion module further has a screw hole on the third side of the computer host, and a third distance between the fixed end of the buffer component and the screw hole is substantially equal to the second distance between the fixed end and the free end of the buffer component.

7. The computer according to claim 1, wherein the keyboard is made of metal and is detachably pivotably connected to the screen, the screen further comprises a magnetic component, and the magnetic component is configured to adhere the keyboard to the screen.

8. The computer according to claim 1, wherein a first area of the keyboard is smaller than a second area of the screen.

9. The compute according to claim 1, wherein the keyboard further comprises a first plate part and a second plate part, the first plate part further has a first pivoting side and a second pivoting side opposite to each other, the first pivoting side of the first plate part is pivotably connected to the screen, and the second pivoting side of the first plate part is pivotably connected to the second plate part.

* * * * *